July 19, 1960

T. K. WOOD 2,945,326

APPARATUS FOR MANUFACTURING GLASS BEADS

Filed May 9, 1958

T. K. WOOD 2,945,326

APPARATUS FOR MANUFACTURING GLASS BEADS

Filed May 9, 1958

United States Patent Office 2,945,326
Patented July 19, 1960

2,945,326
APPARATUS FOR MANUFACTURING GLASS BEADS

Thomas K. Wood, Devon Road, Essex Fells, N.J.

Filed May 9, 1958, Ser. No. 734,251

3 Claims. (Cl. 49—58)

The present invention relates to the manufacture of glass beads and more particularly to the manufacture of very small spherical beads used in the manufacture of reflectors and reflecting paints, for example. Reference may be had to U.S. Patents Nos. 2,334,578 and 2,619,776 to Potters for a disclosure of apparatus of the general type to which this invention is directed. The present invention pertains to a complete system including a furnace of the general type shown in said Potters' patents and which affords precise control of operating conditions whereby great economies in fuel consumption are realized along with improvements in bead recovery and classification.

Apparatus of the general type shown in said Potters' patents is customarily connected with stacks venting to the atmosphere and providing a natural draft. The velocity of upward flow of gases through the furnace has been controlled by variations of the air inlet at the bottom of the draft tube of the furnace. It will be understood that the velocity and temperature must be rather carefully controlled in order to assure upward movement of the finely divided glass particles at such a rate that they may become softened by heat to assume a spherical shape. The spherical particles continue to be transported by upwardly flowing gases through zones in which the gases and particles cool sufficiently for the particles to harden, after which the velocity and/or direction of flow may be changed to cause the hardened spherical particles to fall into suitable collecting vessels. When operations such as those just described are carried out under conditions of natural draft, it is difficult to maintain accurate control upon the velocity and temperature of the gases due to changing atmospheric conditions, wind direction, and the like. The inevitable fluctuations in velocity and temperature conditions within the furnace are reflected in excessive consumption of fuel and in fluctuations in rate of production. Such fluctuations also make it difficult to maintain accurate separation between spherical beads of different sizes. Accordingly, it is the general purpose of the present invention to provide a system wherein the gas velocity is established by a suction fan rather than by the natural draft produced in an open stack, and wherein controls are provided at several points within the system for varying the velocity and/or temperature of the gases in different sections of the apparatus. With such precise control the rate of fuel consumption can be remarkably decreased. Also because the velocity may be maintained at a steady predetermined rate the beads may be quite accurately separated into size groups as an incident to collection. The separation of size groups thus achieved is quite efficient and it may eliminate or at least very greatly reduce subsequent classification of the beads.

It is an object of the present invention to provide apparatus for the manufacture of glass beads at reduced cost and increased efficiency not heretofore available. Other and further objects will become apparent from a consideration of the following detailed description of a preferred, but not necessarily the only, form of the invention, taken in connection with the drawings accompanying and forming a part of this specification.

In the drawings:

Fig. 4 is an enlarged view of a section of the conduit 26 shown in Fig. 1.

Figure 1:
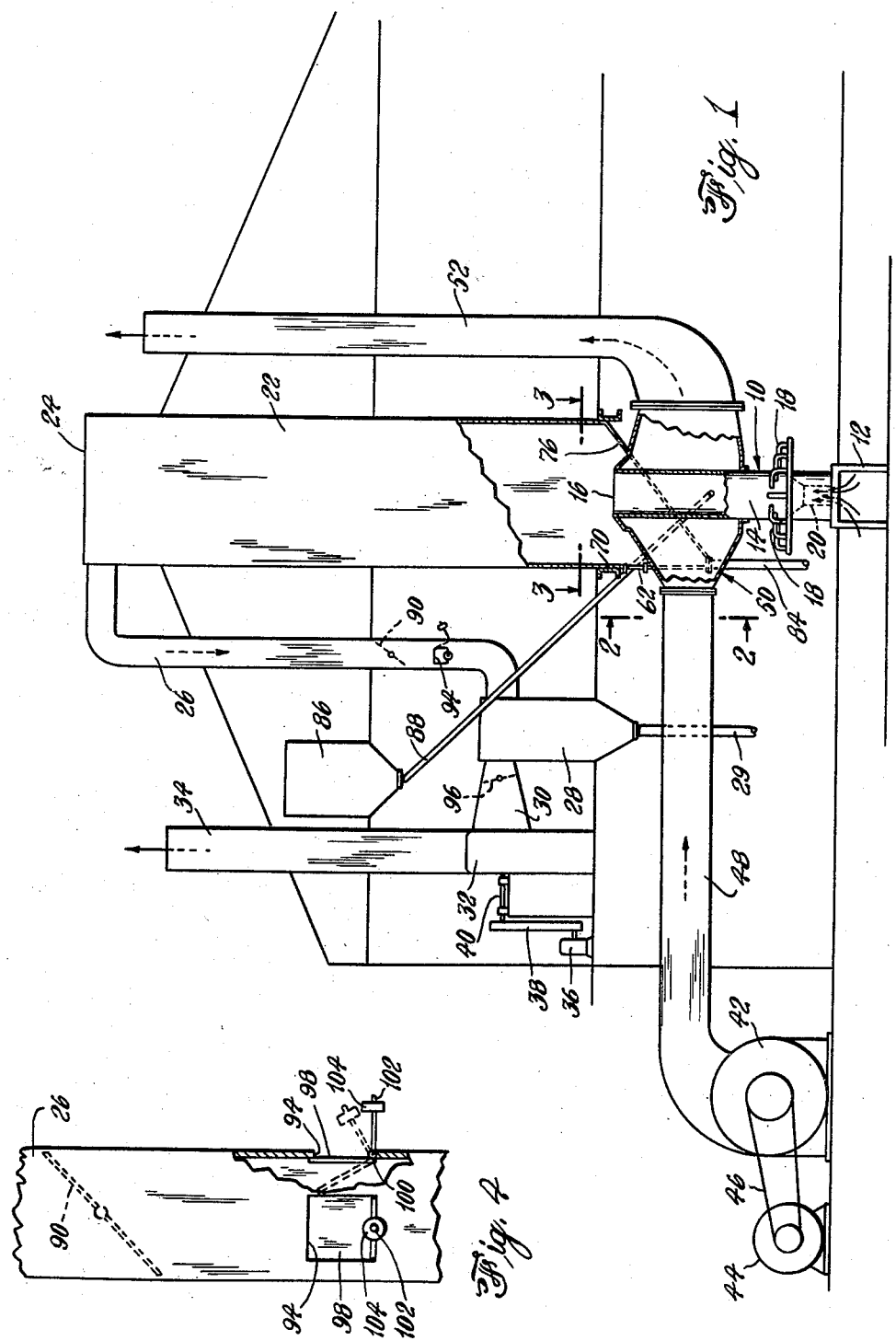
Fig. 1 is a somewhat diagrammatic elevational view, with parts in section, of a preferred form of apparatus embodying the present invention.

In Fig. 1 there is generally indicated at 10 a glass bead making furnace which may be similar to many details to the furnaces shown in the Potters Patent No. 2,334,578. The furnace may rest upon a base 12 and include a generally cylindrical draft tube 14 which is open at its upper end 16. The furnace 10 also may include a plurality of gas jets 18 which project into the draft tube 14 and are so arranged as to form a well distributed gas flame within the draft tube.

The draft tube 14 may be provided at its lower end with a draft regulator 20 consisting of a cylindrical section of appropriate cross section and a frusto-conical section flaring outwardly into contact with the inner surface of the draft tube 14. Air enters the draft tube 14 through the draft regulator 20. In structures such as that shown in the Potters Patent 2,334,578 referred to above, the furnace is connected with a stack which produces a natural draft. Regulation of the draft and thus of the velocity of the gases within the draft tube is achieved by selection of a draft regulator having cross sectional dimensions appropriate for the particular stack system, atmospheric conditions and wind velocity and direction which may prevail at any particular time. Accordingly, it has been the practice in the past to provide a number of draft regulators similar to the draft regulator 20 and to change them in accordance with changes in prevailing conditions. The degree of control thus available has been relatively rough and has been dependent upon the alertness and judgment of the operator. Inevitably the furnace operated under less than ideal conditions for a substantial percentage of the time.

Figure 3:
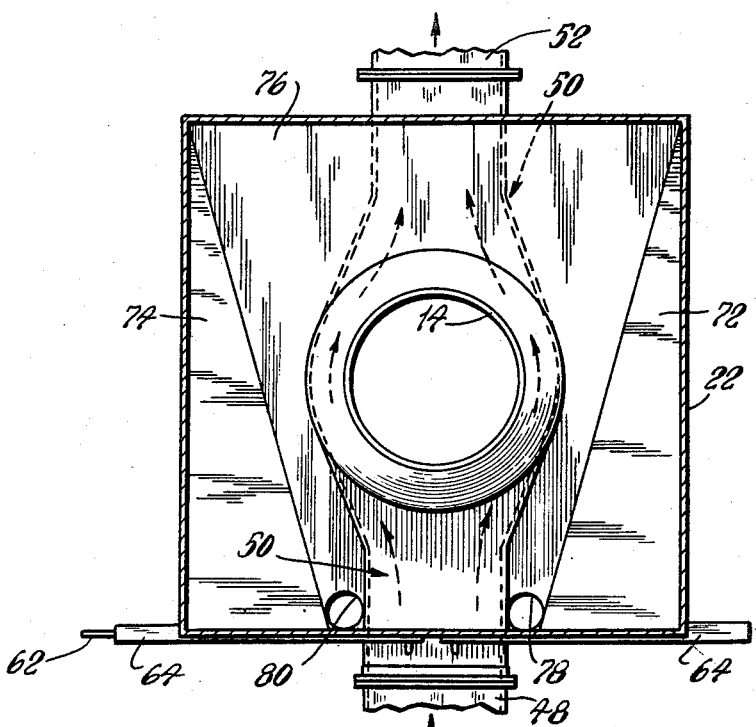
Fig. 3 is a fragmentary sectional view taken along the line 3—3 in Fig. 1.

As shown in Fig. 1, the open end 16 of the draft tube 14 opens into an expansion chamber 22 which preferably is rectangular in cross-section (see Fig. 3) and which is closed at the top 24. From the upper end of the chamber 22 there is provided a conduit 26 which extends downwardly to a separating device 28. A conduit 30 connects the separating device 28 with a suction fan 32 which exhausts upwardly through a conduit 34, the latter being open to the atmosphere. The suction fan 32 may be driven by any suitable means such as a motor 36 connected by a belt 38 with the drive shaft 40 of the fan. Operation of the suction fan 32 will serve to draw air into the furnace 10 through the draft regulator 20 and will serve to withdraw gases from the furnace 10 through the chamber 22, conduit 26, separator 28 and conduit 30 for exhaust to the atmosphere through the conduit 34.

The exterior surface of the draft tube 14 is preferably cooled and in this end there is provided a blower 42 driven in any suitable manner, as by a motor 44 connected with the blower through a belt 46. The high pressure side of the blower 42 is connected with a horizontally disposed conduit 48 which in turn is conducted with a cooling plenum indicated generally at 50. The plenum 50 surrounds the draft tube 14 and exhausts into a vertically disposed conduit 52, the upper end of which is opened to the atmosphere.

Figure 2:
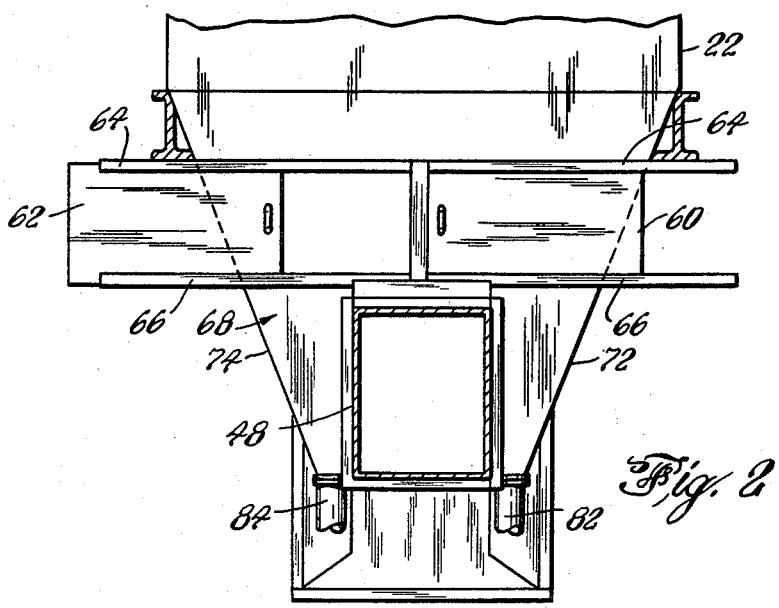
Fig. 2 is a fragmentary sectional view along the line 2—2 in Fig. 1.

Provision is made for the entry into the base of the chamber 22 of relatively cool atmospheric air. Thus in Fig. 2 there is shown a pair of sliding doors 60 and 62 arranged in upper tracks 64 and lower tracks 66. Beyond the doors 60 and 62 there are provided openings which enter the lower tapered portion 68 of the stack 22. The lower tapered portion 68 of the chamber 22 includes a vertical wall 70 (Fig. 1) into which the doors 60 and 62 open as well as converging side walls 72 and 74 which may be seen in Figs. 2 and 3. An inclined bottom wall 76 is positioned between the walls 72 and 74 and extends from one bottom edge of the chamber 22 (see Fig. 1) downwardly on opposite sides of the cooling plenum 50. The lower tapered portion 68 just described serves for the collection of solidified glass beads which fall out of suspension within the expansion chamber 22. At its lowermost point the tapered portion 68 is provided with openings 78 and 80 (see Fig. 3) which communicate with conduits 82 and 84, respectively, through which the beads may fall to appropriate collecting receptacles.

Ground glass particles which have been sorted or classified to produce the size of bead desired are stored in one or more hoppers 86 from which they may flow through suitable conduits 88 to nozzlese (not shown) within the draft tube 14. As shown in the Potters Patent 2,334,578, there may be three such hoppers 86 and conduits 88 which are directed to suitable openings through the cooling plenum and other structures surrounding the draft tube 14 and which eventually enter the draft tube 14 in an evenly distributed pattern around the circumference thereof. Further details of a suitable installation of supply conduits and nozzles may be found in said Potters Patent 2,334,578. It will be understood that when the device of the present invention is in operation the finely divided glass particles are distributed into the interior of the draft tube 14 whereupon they are entrained in the upward flow of hot gases therein. The entrained particles are softened by such hot gases and also are carried upwardly into the expansion chamber 22. The particles cool and solidify within the chamber 22 and a substantial percentage of the larger spherical particles will drop through the relatively quieter lateral zones of the chamber 22 to enter the lower tapered portion 68 from which they are collected. A substantial number of smaller solidified beads will continue to be entrained in the gases and thus will enter the conduit 26. It will be appreciated that the dividing line between the larger particles which fall from the stack 22 and the smaller particles which will be carried into the conduit 26 can be rather sharply defined by careful control of the temperature and velocity of gases within the chamber 22. In this manner there is achieved a separation of the spherical beads into two general classifications and such separation is of considerable advantage in the commercial production of beads of this character.

The smaller beads which enter the conduit 26 may be separated from the gases in which they are entrained by any suitable form of separating device. A preferred form of separating device is a centrifugal separator such as a cyclone or multiclone. It will be understood, of course, that other forms of separators may be used and, particularly in the case of the present invention wherein extensive control of velocity and temperature is reliably available, the smaller particles may be separated from the gas by the passage through porous filter mediums made of glass fibers, asbestos fibers and other fibers capable of withstanding moderately elevated temperatures. For the purposes of the present disclosure the separator 28 may be regarded as any one of the various suitable devices discussed above. The beads collected in the separator 28 are discharged through a pipe 29 to suitable containers.

For the control of velocity and temperatures of the gases in their passage through the various zones of the apparatus herein described, a number of adjustable devices may be employed. In the first place, the suction fan 32 and its driving motor 36 are so selected as to be capable of supplying the maximum draft which may be required of the apparatus. Also, the maximum suction may be controlled by varying the speed of motor 36 or by adjustment of a damper or blast gate 96 positioned in conduit 30. In general it may be stated that the formation of relatively large beads requires substantially greater draft in the draft tube 14 than the manufacture of relatively small beads. In the past this has been controlled by selection of a proper draft regulator 20 as described in detail in Potters Patent 2,334,578 and the maximum draft available, of course, has been dependent upon the rather highly variable natural draft afforded by a stack open to the atmosphere. In the present apparatus the maximum draft established by the suction fan 32 will be entirely steady and reliable and, of course, will be chosen so as to insure efficient manufacture of the maximum desired size of beads.

The sliding doors 60 and 62 described above may be opened to various extents to permit the entrance of atmospheric air into the chamber 22. The admission of relatively greater amounts of air through the doors 60 and 62 will result in a reduced velocity of gases within the draft tube 14 and also will result in a lower temperature within the chamber 22.

The conduit 26 may be provided with an adjustable damper or blast gate 90 similar to the damper or blast gate 96 which is positioned in the conduit 30. The conduit 26 may also be provided with one or more openings 94 each having any suitable form of automatic pressure sensitive closure. For example, each opening may be provided with a door 98 hinged at 100. An arm 102 is fixed to each door 98 and projects outwardly to support a counterweight 104. The counterweights 104 may be adjusted along the arms 102 so that the doors 98 will automatically open to admit atmospheric air in predetermined quantities relative to the pressure within the portion of the conduit 26 between the damper 90 and the separator 28.

It will be understood that suitable instruments may be installed in various sections of the device to indicate pressures, temperatures or velocities as may be desired and may be availed of for specific adjustments of the various controls described herein.

In general the amount of air entering the draft regulator 20 should be related to the size of beads which it is desired to manufacture. As indicated above, the velocity within the draft tube 14 of the furnace 10 should be greater for larger sizes of beads. Assuming that the suction fan 32 and damper 96 have been set at an overall desired maximum as discussed above, the velocity within the draft tube 14 and expansion chamber 22 may be varied by adjustment of the damper 90. Adjustment of the sliding doors 60, 62 will affect the temperature within the expansion chamber 22 and also will affect the velocity in the draft tube 14 relative to the velocity in the chamber 22. Therefore by suitable adjustment of both the damper 90 and doors 60, 62 the specifically required velocity in the draft tube 14 and the specifically required velocity in the chamber 22 may be individually established. In this connection it will be apparent that wider opening of the damper 90 accompanied by a predetermined wider opening of the doors 60, 62 may be effective to increase the velocity within chamber 22 without changing the velocity within the draft tube 14. As a result of such an adjustment the sizes of beads collected respectively in the chamber 22 and the separator may be changed without substantial change in the efficiency of operation of the bead forming operation. Similarly the specific temperatures and velocities within the draft tube 14 may be adjusted and compensating adjustments may be made to maintain the bead classification as desired.

A particular advantage of the flexibility of control provided by the present invention is that the ratio of fuel to air in the draft tube as well as the supplying of additional air to the chamber 22 through doors 60, 62 makes it possible to achieve fuel economies which cannot be achieved with the apparatus heretofore employed.

The adjustment of damper 90 to various positions for the purposes described above would cause changes in pressure and volume of gases flowing in the system between the damper 90 and the suction fan 32 if provision were not made for avoiding or minimizing such changes. There has been disclosed herein an illustrative form of automatic pressure-sensitive means for maintaining desired conditions in this particular zone of the apparatus in view of certain advantages resulting therefrom. For example, many types of filters or separators which may be employed as the separator 28 operate most effectively within rather narrow ranges of volume and pressure differential. Also, different types of filters or parts thereof are incapable of withstanding operation above certain maximum temperatures. For any particular filter of appropriate characteristics the volume, pressure and temperature may be established by suitable adjustment of the counter-weighted doors 98 disclosed herein. Thereafter, adjustments of the damper 90 may be made within a wide range of operating conditions in the furnace 10 and expansion chamber 22 with the assurance that desired operating conditions will be maintained at the separator 28. In this connection it will be understood that variations in pressure within the conduit between damper 90 and separator 28 will result in the bleeding in of varying quantities of air through the openings 94 which will serve to maintain pressure and volume at desired level and will serve to lower the temperature of the gases going to the separator 28.

I claim:

1. Apparatus for producing glass beads of small diameter comprising a vertically disposed draft tube containing heating means, an air inlet at the lower end of said draft tube, means for introducing a stream of glass particles into said tube above the source of heat, an expansion chamber communicating with and extending vertically above said draft tube and having cross sectional dimensions substantially greater than the cross sectional dimensions of said draft tube, bead collecting means located at the base of said expansion chamber and extending laterally of the upper end of said draft tube, a conduit communicating with said expansion chamber in an upper region thereof, a suction fan connected with said conduit adapted to withdraw gases from said expansion chamber, first regulating means for varying the rate of withdrawal of gases from said expansion chamber by said suction fan, means for admitting relatively cool air to said expansion chamber adjacent the upper end of said draft tube, and second regulating means operable independently of said first regulating means for varying the rate of admission of air to said expansion chamber, said first and second regulating means being mutually adjustable to establish any desired combination of velocities of the flow of gases through said draft tube and said expansion chamber respectively.

2. Apparatus for producing glass beads of small diameter comprising a vertically disposed draft tube containing heating means, an air inlet at the lower end of said draft tube, means for introducing a stream of glass particles into said tube above the source of heat, an expansion chamber communicating with and extending vertically above said draft tube and having cross sectional dimensions substantially greater than the cross sectional dimensions of said draft tube, bead collecting means in the lower portion of said expansion chamber and extending laterally of the upper end of said draft tube, first adjustable means in a lower region of said expansion chamber for admitting regulatable amounts of relatively cool air to said chamber, a conduit communicating with said expansion chamber in an upper region thereof, a suction fan connected with said conduit, and second adjustable means in said conduit for regulating the quantity of gases flowing therethrough to said suction fan, said first and second adjustable means being mutually operable to establish any desired combination of velocities of flow of gases through said draft tube and said expansion chamber respectively.

3. Apparatus for producing glass beads of small diameter comprising a vertically disposed draft tube containing heating means, an air inlet at the lower end of said draft tube, means for introducing a stream of glass particles into said tube above the source of heat, an expansion chamber communicating with and extending vertically above said draft tube and having cross sectional dimensions substantially greater than the cross sectional dimensions of said draft tube, bead collecting means in the lower portion of said expansion chamber and extending laterally of the upper end of said draft tube, first adjustable means in a lower region of said expansion chamber for admitting regulatable amounts of relatively cool air to said chamber, a conduit communicating with said expansion chamber in an upper region thereof, a suction fan connected with said conduit, second adjustable means in said conduit for regulating the quantity of gases flowing therethrough to said suction fan, separating means interposed in said conduit between said suction fan and said second adjustable means for separating any particles from the gases flowing therethrough, and automatic means positioned in the portion of said conduit lying between said second adjustable means and said separating means for bleeding into said portion of said conduit such quantity of atmospheric air as may be required to maintain in said portion a predetermined pressure irrespective of the adjustment of said first and second adjustable means, said first and second adjustable means being mutually operable to establish any desired combination of velocities of flow of gases through said draft tube and said expansion chamber, respectively.

References Cited in the file of this patent

UNITED STATES PATENTS

| | | |
|---|---|---|
| 2,306,462 | Moorman | Dec. 29, 1942 |
| 2,334,578 | Potters | Nov. 16, 1943 |
| 2,421,902 | Neuschotz | June 10, 1947 |
| 2,619,776 | Potters | Dec. 2, 1952 |
| 2,838,881 | Plumat | June 17, 1958 |

UNITED STATES PATENT OFFICE
CERTIFICATE OF CORRECTION

Patent No. 2,945,326            July 19, 1960

Thomas K. Wood

It is hereby certified that error appears in the printed specification of the above numbered patent requiring correction and that the said Letters Patent should read as corrected below.

Column 2, line 66, for "conducted" read -- connected --; column 3, line 23, for "nozzlese" read -- nozzles --; line 72, for "temperatures" read -- temperature --; column 4, line 37, for "relative" read -- related --.

Signed and sealed this 3rd day of January 1961.

(SEAL)
Attest:

KARL H. AXLINE
Attesting Officer

ROBERT C. WATSON
Commissioner of Patents